United States Patent
Andrews et al.

[11] 3,742,707
[45] July 3, 1973

[54] GAS TURBINE ENGINES

[75] Inventors: Edward George David Andrews, near Rugby; Robert George Ward, Coventry; John Bertram Holliday, Derby; James Norman Hurst, Repton, all of England

[73] Assignee: Rolls-Royce Limited, Derby, England

[22] Filed: Oct. 20, 1970

[21] Appl. No.: 82,395

[30] Foreign Application Priority Data
Oct. 25, 1969  Great Britain.................. 52,365/69

[52] U.S. Cl............. 60/59 T, 176/DIG. 2, 176/60, 165/141, 165/164, 60/95
[51] Int. Cl.......................... G21d 1/02, G21d 5/06
[58] Field of Search............................ 60/36, 59 T; 165/164, 140, 141; 176/60, 187, DIG. 2

[56] References Cited
UNITED STATES PATENTS
3,444,038  5/1969  Schabert ............................ 60/59 T
3,513,908  5/1970  Singh ................................ 165/164 X
3,516,880  6/1970  Johnson ............................ 60/59 T

FOREIGN PATENTS OR APPLICATIONS
972,901  3/1963  Great Britain................. 176/DIG. 2
542,462  1/1942  Great Britain......................... 60/36

OTHER PUBLICATIONS
Nucleonics, Vol. 14, No. 3, March 1956, Pgs. 34–35.

*Primary Examiner*—Martin P. Schwadron
*Assistant Examiner*—Allen M. Ostrager
*Attorney*—Cushman, Darby & Cushman

[57] ABSTRACT

A closed cycle gas turbine power plant has a compressor, a nuclear reactor disposed in a pressure vessel and a turbine which is connected to receive and be driven by working fluid compressed by the compressor and heated by the nuclear reactor. A heat exchanger receives the working fluid expanded in the turbine and returns it to the compressor, the turbine and the compressor being removably disposed within a first recess in the pressure vessel and the heat exchanger being removably disposed in a second recess in the pressure vessel.

6 Claims, 4 Drawing Figures

GAS TURBINE ENGINES

This invention relates to closed-cycle gas turbine engine power plants and is a modification of the closed-cycle gas turbine engine power plant described and claimed in our co-pending United Kingdom Patent application No. 49638/67.

According to the present invention, a closed-cycle gas turbine engine power plant comprises compressor means, nuclear reactor means disposed within a pressure vessel and connected to receive and heat working fluid compressed by the compressor means, turbine means connected to receive and be driven by working fluid heated by the nuclear reactor means and heat exchange means connected to receive and cool working fluid expanded in the turbine means and to return cooled working fluid to be compressed in the compressor means, the compressor means and the turbine means being removably disposed within a first recess in the pressure vessel and the heat exchange means being removably disposed within a second recess in the pressure vessel.

The heat exchange means preferably comprises a recuperator having a first flow path connected to receive the working fluid expanded in the turbine means in heat exchange relationship with a second flow path connected for the flow of the working fluid passing from the compressor means to the nuclear reactor means and a cooler connected to receive working fluid from the first flow path and to return it to be compressed in the compressor means.

In a preferred embodiment of the invention, the cooler is substantially annular in shape and surrounds the recuperator.

The coolant inlet and outlet of the cooler are preferably both positioned at one end thereof.

Thus the cooler may comprise first and second substantially concentric circular manifolds which are positioned adjacent said one end thereof and which respectively communicate with the coolant inlet and outlet, and first and second annular arrays of pipes which communicate with and extend substantially axially from the first and second manifolds respectively, the ends of pipes of the first array remote from the manifolds communicating with the ends of the pipes of the second array remote from the manifolds.

The first and second recesses are preferably substantially cylindrical and may have their axes vertically disposed.

Where the second recess is vertically disposed, said one end is preferably at the top, and the intercooler is preferably suspended from the coolant inlet and outlet. Additionally, there may be provided a substantially cylindrical baffle within said first and second arrays of pipes, said baffle being arranged to sealingly engage the bottom of the second recess under its own weight so as to separate the first flow path of the recuperator from the working fluid flow path of the cooler.

The compressor means may comprise, in flow series, a low pressure axial flow compressor, an intercooler and a high pressure axial flow compressor.

The intercooler is preferably substantially annular in shape and positioned between and coaxial with the compressors.

The compressor means and the turbine means may be mounted within a substantially cylindrical pod which is removably disposed within its respective recess.

The invention will now be particularly described, by way of non-limitative example only, with reference to the accompanying drawings, of which:

Figure 2:
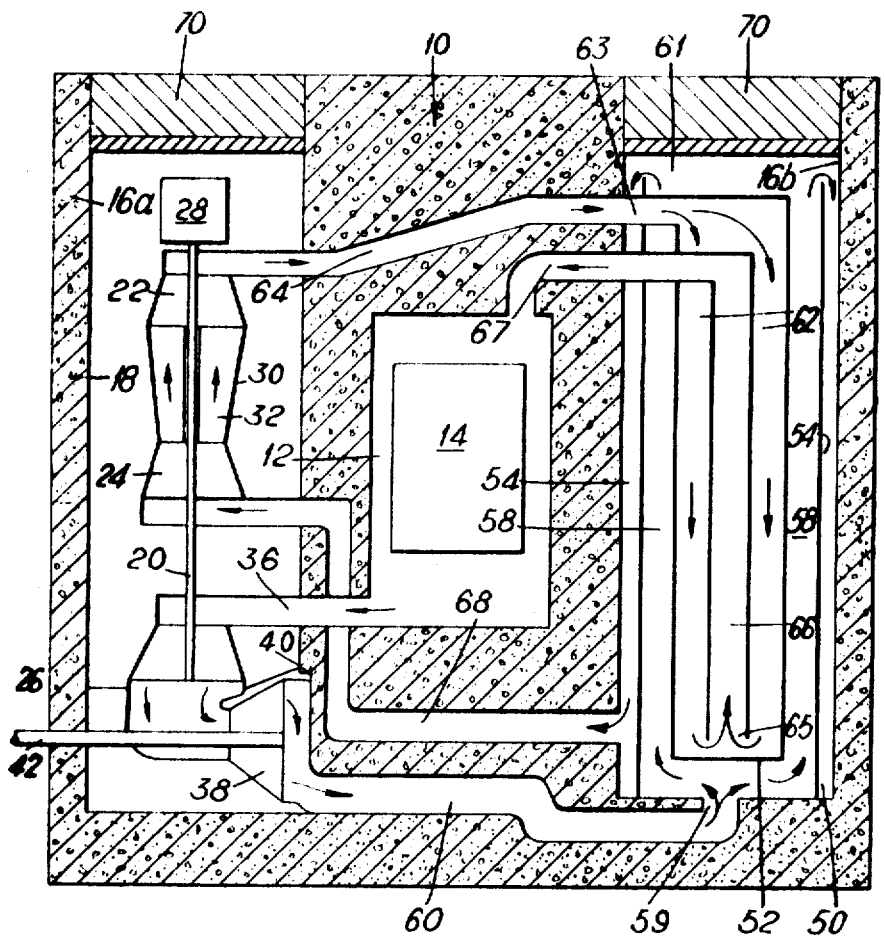
FIG. 2 is a diagrammatic section on the line 2—2 of FIG. 1.

The gas turbine engine power plant shown in the Figures comprises a substantially cylindrical prestressed concrete pressure vessel 10 having its axis substantially vertically disposed and containing, in a centrally disposed recess 12, a gas-cooled nuclear reactor 14. Six equiangularly spaced apart vertically extending cylindrical recesses 16 are provided in the pressure vessel 10 around the recess 12: a pair of adjacent recesses 16 (designated 16a and 16b) is shown in FIG. 2, the remaining two pairs of adjacent recesses 16 being substantially identical to the pair shown.

The recess 16a contains a removably mounted cylindrical pod 18 containing in turn a shaft 20 which is coaxial with the pod 18. Secured to the shaft 20, in descending vertical order as viewed in FIG. 2, are a high pressure axial flow compressor 22, a low pressure axial flow compressor 24 and a high pressure axial flow turbine 26. The upper end of the shaft 20 is connectable to an electric motor 28 for starting purposes, the starter motor 28 also being contained within the pod 18.

A substantially annular intercooler 30 is positioned between the compressor 22, 24 and is coaxial therewith. The intercooler 30 comprises an annular flow duct 32 which communicates between the outlet of the compressor 24 and the inlet of the compressor 22, and which contains a plurality of vertically extending finned pipes (not shown) connected for the flow of cooling water.

The inlet of the turbine 26 communicates with an outlet from the nuclear reactor 14 via a duct 36 extending radially of the pod 18 through the concrete of the pressure vessel 10, while the outlet thereof communicates with the inlet of an axial flow power turbine 38. The turbine 38 is disposed outside the pod 18, with its axis horizontal, in a horizontally disposed cylindrical enlargement 40 at the bottom of the recess 16, and is secured to a horizontal drive shaft 42 which is drivingly connected to an alternator (not shown) disposed externally of the pressure vessel 10. However, if desired the turbine 38 and its shaft 42 may be axially aligned with the shaft 20 and positioned within the pod 18, the alternator being disposed beneath the pressure vessel 10.

The recess 16b contains a substantially annular precooler 50 coaxial therewith and a recuperator 52 positioned within the precooler 50. The precooler 50 and the recuperator 52 are removable from the recess 16b. The precooler 50 comprises an annular flow duct 54 which contains a plurality of finned pipes 55 (see FIG. 3) connected for the flow of cooling water. The recuperator 52 comprises a first flow path 58 having an inlet 59 connected, via a horizontally extending duct 60 through the concrete of the pressure vessel 10, to the outlet of the turbine 38 and an outlet 61 connected to the inlet of the annular flow duct 54 of the precooler 50, and a second flow duct 62 comprising a plurality of finned pipes (not shown) and having an inlet 63 connected, via a horizontally extending duct 64 through the concrete of the pressure vessel 10, to the outlet of the compressor 22 and an outlet 65 connected, via a vertically upwardly extending duct 66 connected to a duct 67 extending radially of the recess 16b through the concrete of the pressure vessel 10, to an inlet to the nuclear reactor 14. The outlet of the annular flow duct 54 of the precooler 50 is connected, via a horizontally extending duct 68 through the concrete of the pressure vessel 10, to the inlet of the compressor 24.

Each of the recesses 16 is closed by a double closure member 70 which may be similar to those disclosed in either of our co-pending United Kingdom Patent applications 33975/68 (Ser. No. 1,167,488) and 33976/68 (Ser. No. 1,161,670).

Figure 1:
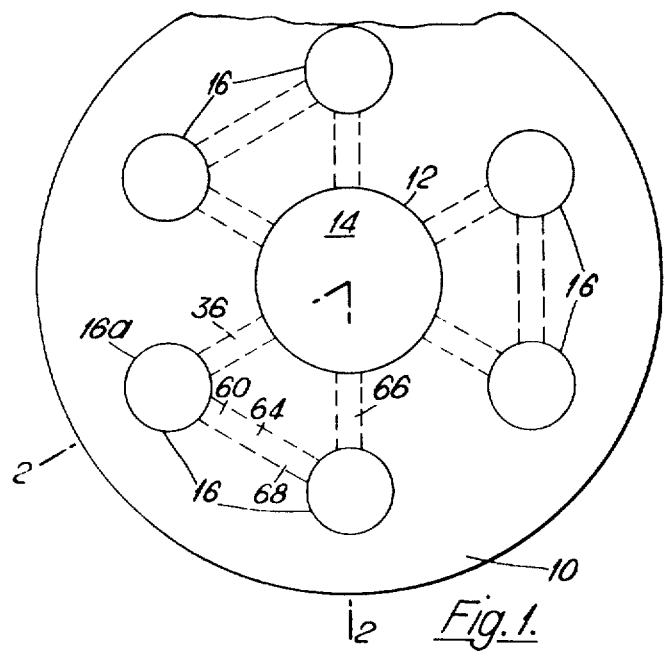
FIG. 1 is a somewhat diagrammatic plan view of a closed cycle gas turbine engine power plant in accordance with the present invention.
Figure 4:
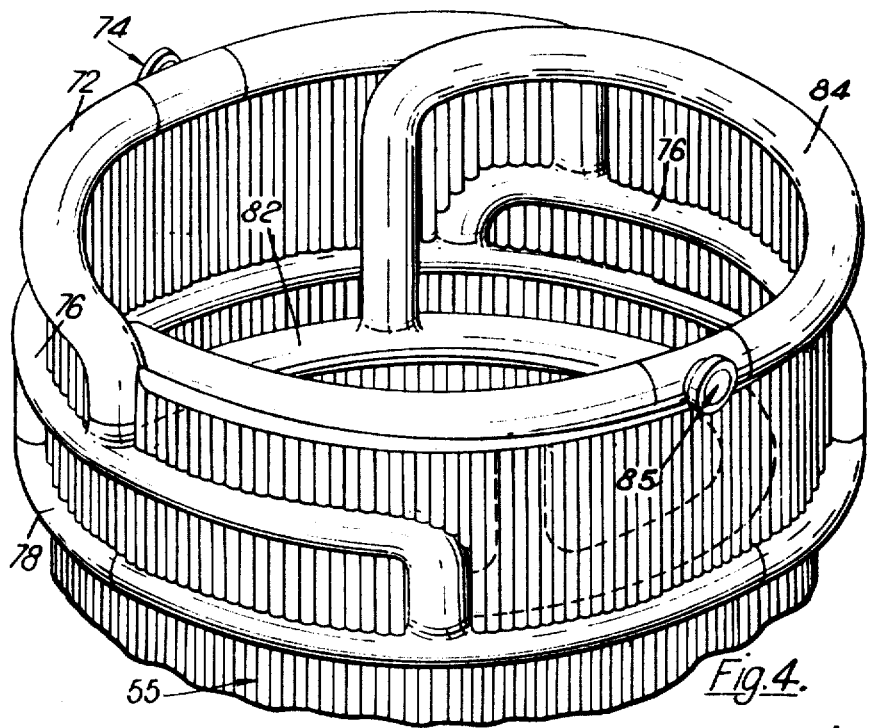
FIGS. 3 and 4 are more detailed views of part of FIG. 2.
Figure 3:
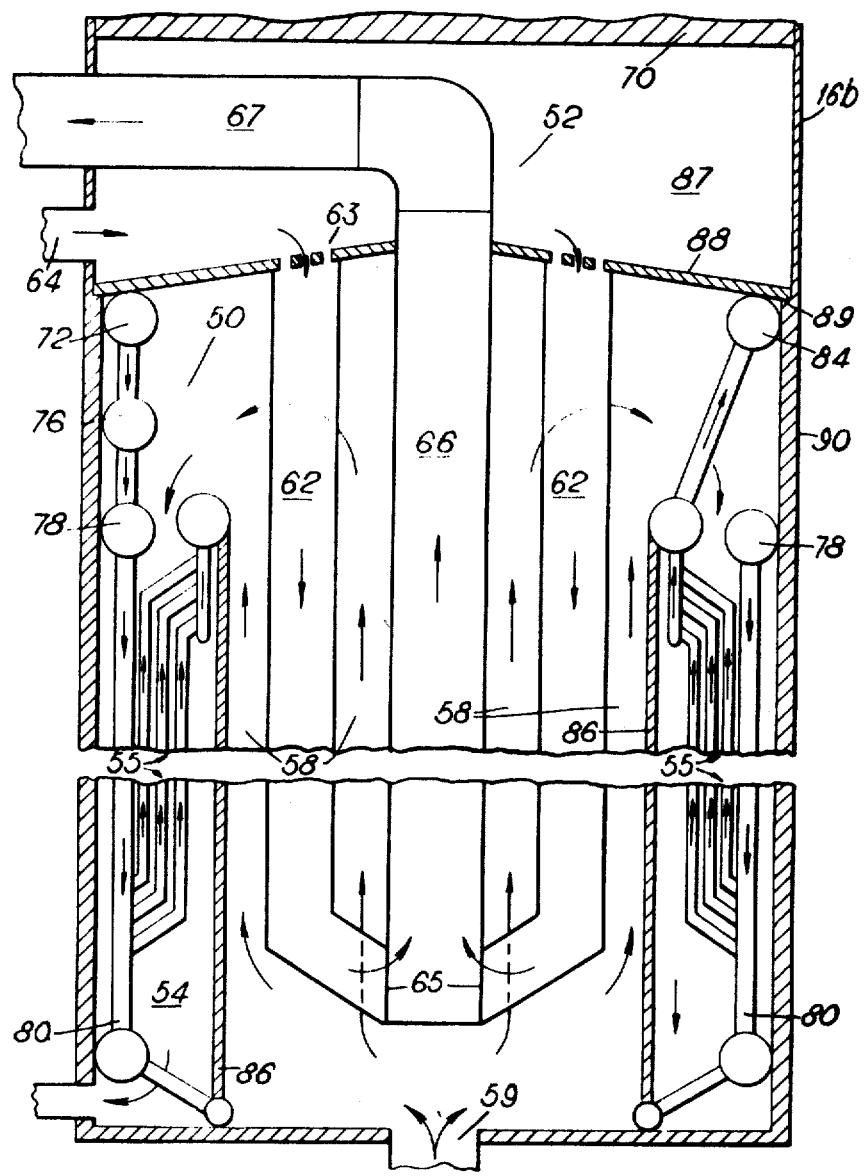

The precooler 50 and the recuperator 52 are shown in more detail in FIGS. 3 and 4. The precooler 50 comprises a semi-circular water inlet manifold 72 which is positioned at the top thereof and the middle of which is provided with a radially outwardly extending water inlet 74. The opposite ends of the manifold 72 are connected, via two part-circular intermediate manifolds 76, to a circular main distribution manifold 78. The manifolds 72, 76, 78 are coaxial with the recess 16b, and substantially equal in diameter and vertically spaced from each other.

A plurality of vertically downwardly extending pipes 80 are connected to the manifold 78 about its entire periphery, and the spaced-apart finned pipes 55 communicate with, and extend upwardly from, the bottoms of the pipes 80 to form an annular array coaxial with and positioned within the cylindrical space enclosed by the pipes 80. The upper ends of the pipes 55 communicate with a circular main collection manifold 82 which is substantially concentric with and positioned within the manifold 78 and which communicates in turn with a semi-circular outlet manifold 84 concentric with and diametrically opposed to the manifold 72. The middle of the manifold 84 is provided with a radially outwardly extending outlet 85 which is thus diametrically opposite the inlet 74.

The radially innermost of the pipes 55 are secured to a cylindrical baffle 86 which extends the full length of the precooler 50 and which sealingly engages the bottom of the recess 16b under its own weight. The intercooler 50 is also supported by being suspended from the inlet 74 and outlet 86 and their respective semicircular manifolds 72,84. The inlet 59 of the recuperator 52 is positioned in the bottom of the recess 16b within the circle defined by the baffle 86, while the outlet of annular flow duct 54 of the precooler 50 is positioned at the bottom of the recess 16b in the wall thereof. The baffle 86 therefore constrains the working fluid of the power plant to flow up the first flow path 58 of the recuperator 52, in contra-flow to the working fluid flowing down the pipes of the second flow path 62 of the recuperator 52, and down the flow duct 54 of the precooler 50 in contra-flow to the water flowing in pipes 55.

The inlet 63 of the pipes constituting second flow path 62 of the recuperator 52 communicates with a space 87 (see FIG. 3) in the recess 16b, which space communicates with the duct 64. The space 87 is sealed between the closure member 70 and an annular flange 88 which is welded around the external surface of the duct 66 and which seats on a radially inwardly projecting land 89 provided on a metal liner 90 of the recess 16b. The duct 66 is disconnectably connected to the duct 67 above the flange 88.

In order to remove the precooler 50 and the recuperator 52 from the recess 16b, it is only necessary to disconnect the water inlet 74, the water outlet 86 and the connection between the ducts 66 and 67, all of which are at the top of the recess 16b and thus readily accessible.

In operation, the working fluid of the power plant (which is preferably helium, but may be carbon dioxide) enters and is compressed in the compressor 24, and then passes through and is cooled in the intercooler 30 before being further compressed in the compressor 22. The compressed working fluid leaving the compressor 22 passes through and is heated as will hereinafter be described in the second flow path 62 of the recuperator 52 and is then further directly heated in the nuclear reactor 14, of which it constitutes the coolant: however, the nuclear reactor 14 could be arranged to heat the working fluid indirectly if desired.

The heated working fluid leaving the nuclear reactor 14 first passes into and drives the turbine 26, thereby driving the compressors 22,24 and then passes into and drives the turbine 38 and its drive shaft 42. The working fluid expanded in the turbine 38 passes through the first flow path 58 of the recuperator 52, thus being cooled while heating the working fluid flowing in the second flow path 62, and then passes through and is further cooled in the precooler 50 before re-entering the compressor 24.

Advantageously, the working cycle and the control system of the power plant are described in more detail in our co-pending United Kingdom Patent applications numbers 43819/68, 43820/68 and 43821/68.

The arrangement of the components of one working cycle of the power plant in two recesses 16a, 16b instead of one produces two substantially equally sized assemblies of components, which assemblies are each smaller and therefore more manageable than a single pod containing all the components and which reduce the overall height of the pressure vessel 10. Further, the arrangement of the precooler 50 around the recuperator 52 thermally insulates the latter from the pressure vessel 10, thereby reducing the thermal stresses to which the pressure vessel 10 is subjected. Finally the axial alignment of the outlet of the compressor 24, the flow duct 32 of the intercooler 30 and the inlet of the compressor 22 reduces the flow losses in the intercooler 30.

We claim:

1. A closed-cycle gas turbine engine power plant comprising: compressor means; nuclear reactor means disposed within a pressure vessel and connected to receive and heat working fluid compressed by the compressor means; turbine means connected to receive and be driven by working fluid heated by the nuclear reactor means; and heat exchange means connected to receive and cool working fluid expanded in the turbine means and to return cooled working fluid to be compressed in the compressor means, the compressor means and the turbine means being removably disposed within a first recess in the pressure vessel and the heat exchange means being removably disposed within a second recess in the pressure vessel; said heat exchange means comprising a recuperator having a first flow path connected to receive the working fluid expanded in the turbine means in heat exchange relationship with a second flow path connected for the flow of the working fluid passing from the compressor means to the nuclear reactor means, and a cooler connected to receive working fluid from the first flow path and to return it to be compressed in the compressor means, said cooler comprising first and second substantially co-axial part-circular manifolds which are positioned adjacent one end thereof and which respectively communicate with the coolant inlet and outlet, and first and second annular arrays of pipes which communicate with and extend substantially axially from the first and second manifolds respectively, the ends of pipes of the first array remote from the manifolds communicating with the ends of the pipes of the second array remote from the manifolds, and a substantially cylindrical baffle within said first and second arrays of pipes, said baffle being arranged to sealingly engage the bottom of the second recess under its own weight so as to separate the first flow path of the recuperator from the working fluid flow path of the cooler.

2. A closed-cycle gas turbine engine power plant comprising compressor means, nuclear reactor means disposed within a pressure vessel and connected to receive and heat working fluid compressed by the compressor means, turbine means connected to receive and be driven by working fluid heated by the nuclear reactor means and heat exchange means connected to receive and cool working fluid expanded in the turbine means and to return cooled working fluid to be compressed in the compressor means, the compressor means and the turbine means being removably disposed within a first recess in the pressure vessel and the heat exchange means being removably disposed within a second recess in the pressure vessel, said recesses being separated by portions of the pressure vessel, said heat exchange means comprising a recuperator having a first flow path connected to receive the working fluid expanded in the turbine means in heat exchange relationship with a second flow path connected for the flow of the working fluid passing from the compressor means to the nuclear reactor means, and a substantially annular cooler surrounding the recuperator and connected to receive working fluid from the first flow path and to return it to be compressed in the compressor means.

3. A closed-cycle gas turbine engine power plant comprising compressor means, nuclear reactor means disposed within a pressure vessel and connected to receive and heat working fluid compressed by the compressor means, turbine means connected to receive and be driven by working fluid heated by the nuclear reactor means and heat exchange means connected to receive and cool working fluid expanded in the turbine means and to return cooled working fluid to be compressed in the compressor means, the compressor means and the turbine means being removably disposed within a first recess in the pressure vessel and the heat exchange means being removably disposed within a second recess in the pressure vessel, said recesses being separated by portions of the pressure vessel, said heat exchange means comprising a recuperator having a first flow path connected to receive the working fluid expanded in the turbine means in heat exchange relationship with a second flow path connected for the flow of the working fluid passing from the compressor means to the nuclear reactor means, and a cooler connected to receive working fluid from the first flow path and to return it to be compressed in the compressor means, said cooler comprising first and second substantially co-axial part-circular manifolds which are positioned adjacent said one end thereof and which respectively communicate with the coolant inlet and outlet, and first and second annular arrays of pipes which communicate with and extend substantially axially from the first and second manifolds respectively, the ends of pipes of the first array remote from the manifolds communicating with the ends of the pipes of the second array remote from the manifolds.

4. A power plant as claimed in claim 2, wherein the coolant inlet and outlet of the cooler are both positioned at one end thereof.

5. A power plant as claimed in claim 2, wherein the first and second recesses are substantially cylindrical and have their axes vertically disposed.

6. A power plant as claimed in claim 2, wherein the compressor means and the turbine means are mounted within a substantially cylindrical pod which is removably disposed within its respective recess.

* * * * *